(12) United States Patent
Lowe

(10) Patent No.: US 6,678,989 B1
(45) Date of Patent: Jan. 20, 2004

(54) FOLDING POLE SPEAR SYSTEM

(76) Inventor: Andrew D. Lowe, 1245 Periwinkle Pl., Wellington, FL (US) 33414-8630

( * ) Notice: Subject to any disclaimer, the term of this patent is extended or adjusted under 35 U.S.C. 154(b) by 0 days.

(21) Appl. No.: 10/342,635

(22) Filed: Jan. 15, 2003

(51) Int. Cl.[7] ............................................. A01K 81/04
(52) U.S. Cl. ....................................................... 43/6
(58) Field of Search ............................ 43/6, 5; 294/57, 294/61

(56) References Cited

U.S. PATENT DOCUMENTS

| | | | | | |
|---|---|---|---|---|---|
| 1,131,669 | A | * | 3/1915 | Bremer | 224/182 |
| 1,348,145 | A | * | 8/1920 | Arden | 15/104.165 |
| 2,500,257 | A | * | 3/1950 | Mahan | 224/250 |
| 2,535,548 | A | * | 12/1950 | Porter | 99/421 A |
| 2,902,789 | A | * | 9/1959 | Mehr | 43/18.1 CT |
| 3,004,362 | A | * | 10/1961 | Day | 43/6 |
| 3,036,398 | A | * | 5/1962 | Gagner | 43/18.1 CT |
| 3,245,169 | A | * | 4/1966 | Kennel | 43/18.1 CT |
| 3,635,233 | A | * | 1/1972 | Robertson | 135/71 |
| 3,669,133 | A | * | 6/1972 | Hyman | 135/74 |
| 3,730,544 | A | * | 5/1973 | Hyman | 280/819 |
| 3,932,953 | A | * | 1/1976 | Sharp | 43/6 |
| 3,947,141 | A | * | 3/1976 | Casset | 43/18.1 CT |
| 3,963,037 | A | * | 6/1976 | Clark | 135/65 |
| 4,052,808 | A | * | 10/1977 | Crabtree | 43/6 |
| 4,160,607 | A | * | 7/1979 | Reichow | 43/18.1 CT |
| 4,209,929 | A | * | 7/1980 | Mishima | 43/6 |
| 4,429,480 | A | * | 2/1984 | Stude | 43/6 |
| 4,463,981 | A | * | 8/1984 | Curry | 294/61 |
| 4,720,933 | A | * | 1/1988 | Stude | 43/6 |
| 4,795,165 | A | * | 1/1989 | Tehan | 473/578 |
| 4,807,382 | A | * | 2/1989 | Albrecht | 43/6 |
| 5,163,242 | A | * | 11/1992 | Smith | 43/6 |
| 5,194,678 | A | * | 3/1993 | Kramer | 42/94 |
| D374,267 | S | * | 10/1996 | Frost et al. | D22/134 |
| 5,775,021 | A | * | 7/1998 | Weiss | 42/95 |
| 6,003,915 | A | * | 12/1999 | Bierman | 294/57 |
| 6,230,728 | B1 | * | 5/2001 | Reese | 135/98 |
| 6,397,513 | B1 | * | 6/2002 | Reed | 43/53.5 |
| 6,571,505 | B1 | * | 6/2003 | Poiencot, Jr. | 43/5 |

FOREIGN PATENT DOCUMENTS

| | | | | |
|---|---|---|---|---|
| FR | 862011 | B1 * | 2/1941 | 43/6 |
| JP | 9-113 | B1 * | 1/1997 | |
| WO | WO-84/00667 | B1 * | 3/1984 | 43/5 |
| WO | WO-98/24311 | B1 * | 6/1998 | |

* cited by examiner

Primary Examiner—Darren W. Ark
(74) Attorney, Agent, or Firm—Edward P. Dutkiewicz

(57) ABSTRACT

Hollow cylinders include forward, rearward and intermediate cylinders. A hollow coupling tube is in the forward portion of each cylinder except for the forward and next adjacent cylinder. Each tube is received in an adjacent portion of each adjacent cylinder. A first washer has a small axial aperture positioned into an intermediate region. A second washer has a small axial aperture positioned into an intermediate region. An elastic cord has a rearward extent through the small first axial aperture with a securement knot at its rearward end. The elastic cord has a forward extent through the small second axial aperture with a securement knot at its forward end. The intermediate extent passes through the cylinders to insure the retention of each cylinder to the next adjacent cylinder. The cylinders are adapted to be coupled into a long linear spear through the coupling action of the cylinders, tubes, plugs and cord.

6 Claims, 4 Drawing Sheets

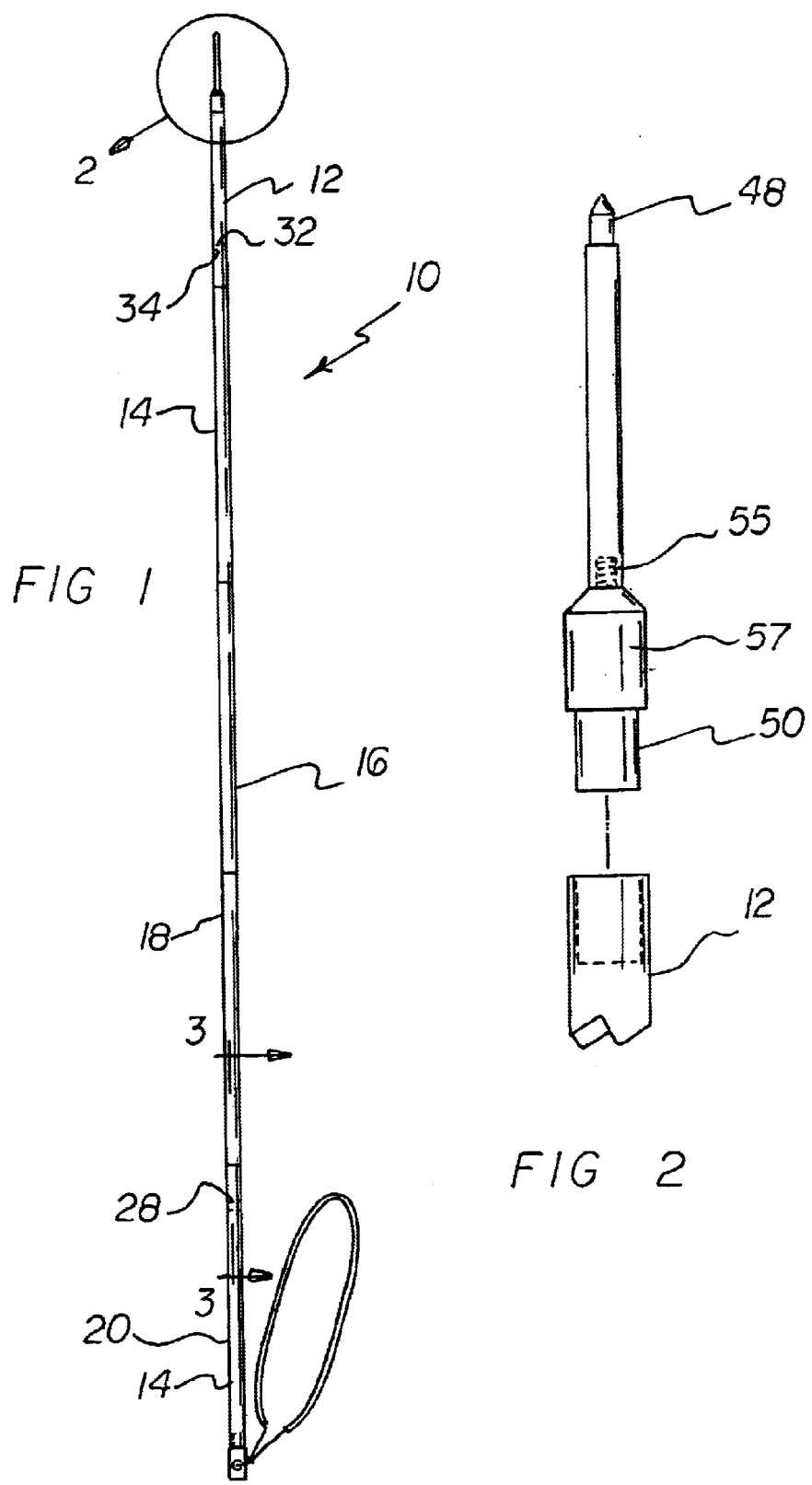

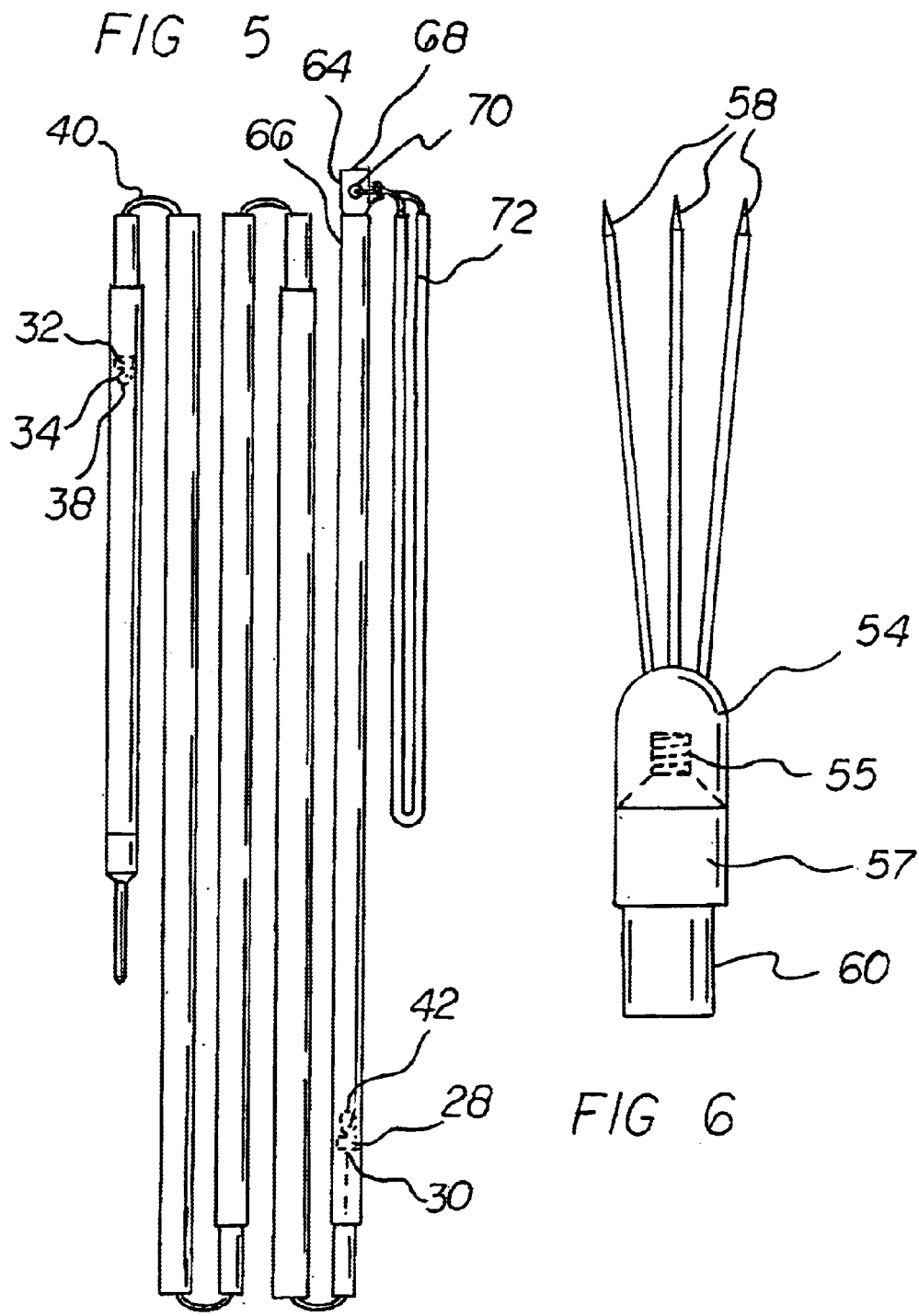

FOLDING POLE SPEAR SYSTEM

BACKGROUND OF THE INVENTION

1. Field of the Invention

The present invention relates to a folding pole spear system and more particularly pertains to safely and conveniently assembling, disassembling and utilizing a pole spear.

2. Description of the Prior Art

The use of spear systems is known in the prior art. More specifically, spear systems previously devised and utilized for the purpose of utilizing spears are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,052,808 to Crabtree discloses a collapsible fish spear. U.S. Pat. No. 3,932,953 to Sharp discloses extensible shaft and fishing spears. U.S. Pat. No. 6,230,728 to Reese discloses an umbrella-type tent apparatus and method. U.S. Pat. No. 5,163,242 to Smith discloses a hunting spear. U.S. Pat. No. 4,807,382 to Albrecht discloses a fishing arrow. U.S. Pat. No. 4,209,929 to Mishima discloses a lance for spear fishing. U.S. Pat. No. 4,720,933 to Stude discloses a diving spear and sling fastening apparatus therefor. U.S. Pat. No. 3,004,362 to Day discloses a handle with adapter for fishing implements. Finally, U.S. Pat. No. Des. 374,267 to Frost et al discloses a fishing gig.

While these devices fulfill their respective, particular objectives and requirements, the aforementioned patents do not describe a folding pole spear system that allows safely and conveniently assembling, disassembling and utilizing a pole spear.

In this respect, the folding pole spear system according to the present invention substantially departs from the conventional concepts and designs of the prior art, and in doing so provides an apparatus primarily developed for the purpose of safely and conveniently assembling, disassembling and utilizing a pole spear.

Therefore, it can be appreciated that there exists a continuing need for a new and improved folding pole spear system which can be used for safely and conveniently assembling, disassembling and utilizing a pole spear. In this regard, the present invention substantially fulfills this need.

SUMMARY OF THE INVENTION

In view of the foregoing disadvantages inherent in the known types of spear systems now present in the prior art, the present invention provides an improved folding pole spear system. As such, the general purpose of the present invention, which will be described subsequently in greater detail, is to provide a new and improved folding pole spear system and method which has all the advantages of the prior art and none of the disadvantages.

To attain this, the present invention essentially comprises a plurality of hollow cylinders. The cylinders include a forward cylinder, a rearward cylinder, a central cylinder, a first intermediate cylinder and a second intermediate cylinder. Each cylinder is fabricated of aluminum. Each cylinder has a forward portion and a rearward portion. Each cylinder further has a substantially common diameter interiorly and exteriorly.

A hollow coupling tube is provided. The hollow coupling tube is positioned in the rearward portion of the forward cylinder and the forward portion of each cylinder except for the forward and first intermediate cylinders. Each coupling tube is removably received in an adjacent portion of adjacent each cylinder except for the rearward cylinder.

A pair of similarly configured short washers is provided next. The washers include a first washer. The first washer has a small first axial aperture. The small first axial aperture is positioned into an intermediate region of the rearward cylinder. The washers also include a second washer. The second washer has a small second axial aperture. The small second axial aperture is positioned into an intermediate region of the forward cylinder.

Next, an elastic cord is provided. The elastic cord has a rearward extent. The rearward extent passes through the small first axial aperture with a securement knot at its rearward end. The elastic cord has a forward extent. The forward extent passes through the small second axial aperture with a securement knot at its forward end. The intermediate extent of the cord passes through all of the cylinders. In this manner the retention of each cylinder to the next adjacent cylinder is insured. The cylinders are adapted to be coupled into a long linear spear through the coupling action of the cylinders, tubes, plugs and cord.

Also provided is a first replaceable tip. The first replaceable tip has a stainless steel point at its forward end. The first replaceable tip has an aluminum cylindrical projection at its rearward end for positioning in the forward end of the forward cylinder.

Next, a second replaceable tip is provided. The second replaceable tip has a plurality of diverging stainless steel points at its forward end. The second replaceable tip has an aluminum cylindrical projection at its rearward end for removably positioning in the forward end of the forward cylinder.

Further provided is a plastic rearward plug. The rearward plug has a forward end. The forward end is press fit into the rearward end of the rearward cylinder. The rearward plug has a rearward end. A diametrical bore is provided through the rearward end. An elastic strap is provided. The elastic strap is looped through the bore for facilitating the projecting of the pole during operation and use.

Provided last is a holster. The holster has a cylindrical region. The cylindrical region has a closed lower end and an open upper end for receiving the cylinders when disassembled. The holster also has a strap. The strap has a fixed end. The fixed end is secured to the cylindrical region. The strap also has a free end. The free end has a coupling component. The coupling component allows for separable coupling to the cylindrical region. The holster further has spaced straps. The spaced straps are coupled to the cylindrical region for retaining the system adjacent to a leg of the user.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved folding pole spear system which has all of the advantages of the prior art spear systems and none of the disadvantages.

It is another object of the present invention to provide a new and improved folding pole spear system which may be easily and efficiently manufactured and marketed.

It is further an object of the present invention to provide a new and improved folding pole spear system which is of durable and reliable constructions.

An even further object of the present invention is to provide a new and improved folding pole spear system which is susceptible of a low cost of manufacture with regard to both materials and labor, and which accordingly is then susceptible of low prices of sale to the consuming public, thereby making such folding pole spear system economically available to the buying public.

Even still another object of the present invention is to provide a folding pole spear system for safely and conveniently assembling, disassembling and utilizing a pole spear.

Lastly, it is an object of the present invention to provide a new and improved folding pole spear system with hollow cylinders including forward, rearward and intermediate cylinders. A hollow coupling tube is in the forward portion of each cylinder except for the forward and next adjacent cylinder. Each tube is received in an adjacent portion of each adjacent cylinder. A first washer has a small axial aperture positioned into an intermediate region. A second washer has a small axial aperture positioned into an intermediate region. An elastic cord has a rearward extent through the small first axial aperture with a securement knot at its rearward end. The elastic cord has a forward extent through the small second axial aperture with a securement knot at its forward end. The intermediate extent passes through the cylinders to insure the retention of each cylinder to the next adjacent cylinder. The cylinders are adapted to be coupled into a long linear spear through the coupling action of the cylinders, tubes, plugs and cord.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a fishing pole spear system constructed in accordance with the principles of the present invention.

FIG. 2 is an exploded front elevational view taken at circle 2 of FIG. 1.

FIG. 5 is a front elevational view of the fishing pole spear system of FIG. 1, but with the sections disassembled.

FIG. 6 is a front elevational view of an alternate tip for use with the fishing pole spear system of FIG. 1.

The same reference numerals refer to the same parts throughout the various Figures.

DESCRIPTION OF THE PREFERRED EMBODIMENT

Figures 3, 4:
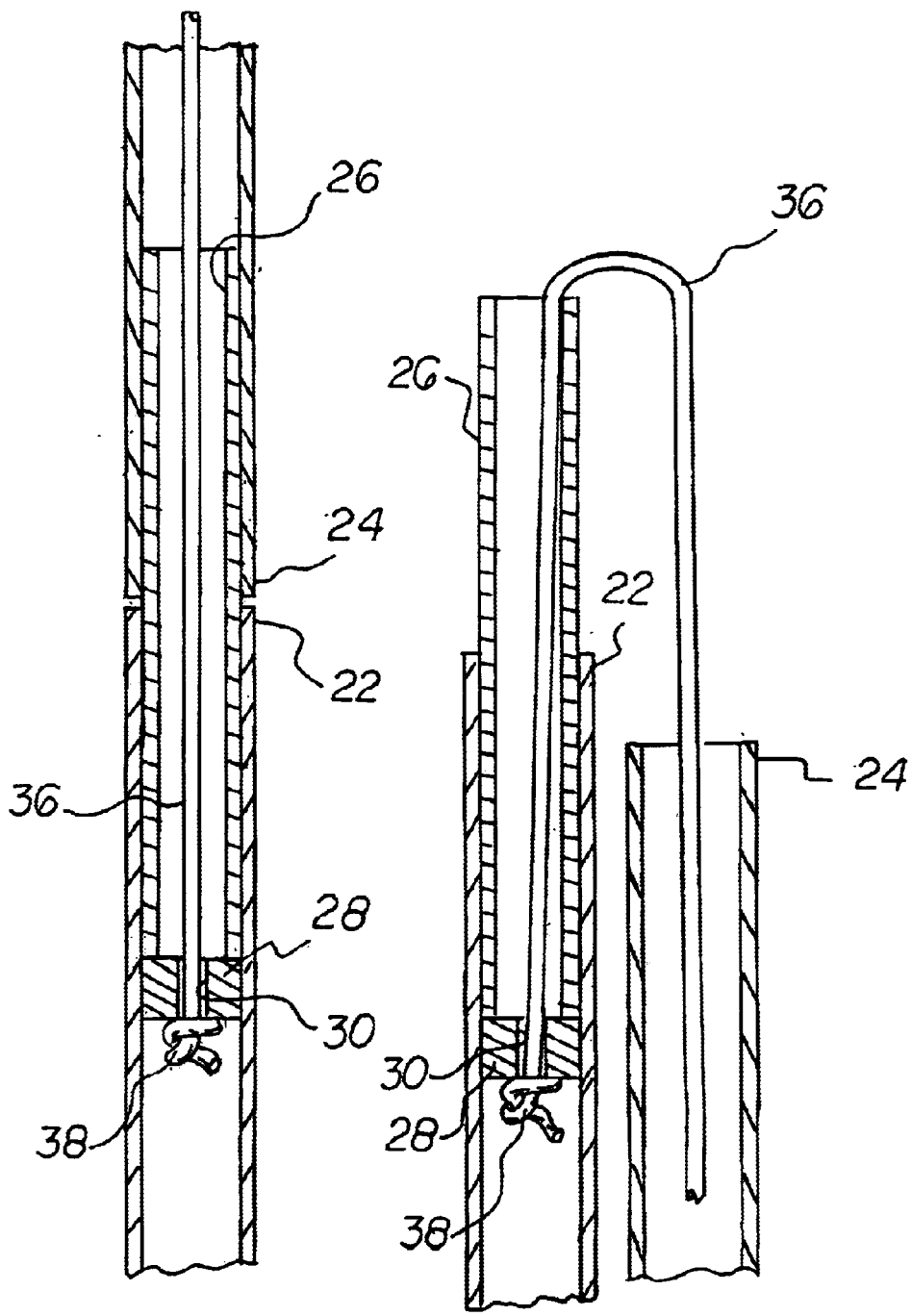
FIG. 3 is a cross-sectional view taken along line 3—3 of FIG. 1.
FIG. 4 is a cross-sectional view taken along line 3—3 of FIG. 1, but with the sections disassembled.
Figure 7:
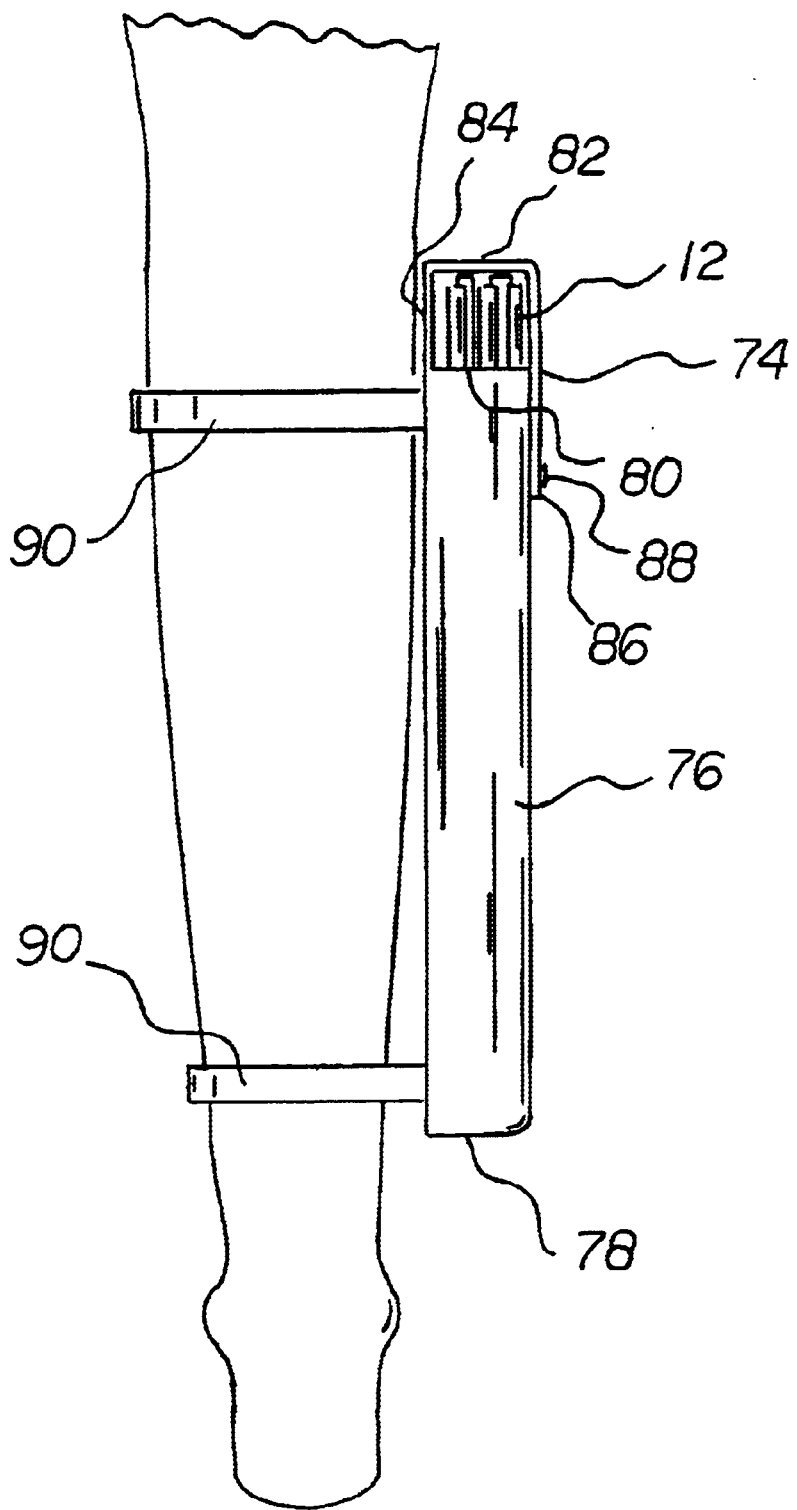
FIG. 7 is a front elevational view of the fishing pole spear system of FIG. 1 and also including a holster as part of the system and strapped to a limb of a user.

With reference now to the drawings, and in particular to FIG. 1 thereof, the preferred embodiment of the new and improved folding pole spear system embodying the principles and concepts of the present invention and generally designated by the reference numeral 10 will be described.

The present invention, the folding pole spear system 10 is comprised of a plurality of components. Such components in their broadest context include a plurality of hollow cylinders, a hollow coupling tube, a pair of similarly configured short plugs and an elastic cord. Such components are individually configured and correlated with respect to each other so as to attain the desired objective.

First provided is a plurality of hollow cylinders 12, 14, 16, 18, 20. The cylinders include a forward cylinder 12, a rearward cylinder 20, a central cylinder 16, a first intermediate cylinder 14 and a second intermediate cylinder 18. Each cylinder is fabricated of aluminum. Each cylinder has a forward portion 22 and a rearward portion 24. Each cylinder further has a substantially common diameter interiorly and exteriorly.

A hollow coupling tube 26 is provided. The hollow coupling tube is positioned in the rearward portion of the forward cylinder. The hollow coupling tube is positioned in the forward portion of each cylinder except for the forward cylinder which has the hollow coupling tube positioned in the rearward portion of the cylinder and first intermediate cylinder which does not have a hollow coupling tube. Each coupling tube is removably received in an adjacent portion of each adjacent cylinder except for the rearward cylinder.

A pair of similarly configured short washers is provided next. The washers include a first washer 28. The first washer has a small first axial aperture 30. The small first axial aperture is positioned into an intermediate region of the rearward cylinder and abuts the hollow coupling tube of the rearward cylinder. The washers also include a second washer 32. The second washer has a small second axial aperture 34. The small second axial aperture is positioned into an intermediate region of the forward cylinder and abuts the hollow coupling tube of the forward cylinder.

Next, an elastic cord 36 is provided. The elastic cord has a rearward extent. The rearward extent passes through the small first axial aperture with a securement knot 38 at its rearward end. The elastic cord 36 has a forward extent 40. The forward extent passes through the small second axial aperture with a securement knot 42 at its forward end. The intermediate extent of the cord passes through all of the cylinders. In this manner the retention of each cylinder to the next adjacent cylinder is insured. The cylinders are adapted to be coupled into a long linear spear through the coupling action of the cylinders, tubes, plugs and cord.

Also provided is a first replaceable tip 44. The first replaceable tip has a stainless steel point 48 at its forward end. The first replaceable tip has a cylindrical projection 50 at its rearward end for removably positioning in the forward end of the forward cylinder. The first replaceable tip 44 with point 48 is mated to a stainless steel shaft 57 with matching female threads 55. The stainless steel shaft 57 is threaded into tip 44, which is secured to the spear 12 by pressing projection 50 into spear 12.

Next, a second replaceable tip 54 is provided. The second replaceable tip has a plurality of diverging stainless steel points 58 at its forward end. The second replaceable tip has matching female threads 55 at its rearward end for removably allowing the positioning of the replaceable tip on the forward end of the stainless steel shaft 57 with a cylindrical projection 60 at its rearward end for positioning in the forward end of the forward cylinder. These replaceable tips are for illustrative purposes only since a large number of tip designs could be readily utilized.

Further provided is a plastic rearward plug 64. The rearward plug has a forward end 66. The forward end is press fit into the rearward end of the rearward cylinder. The rearward plug has a rearward end 68. A diametrical bore 70 is provided through the rearward end. An elastic strap 72 is provided. The elastic strap is looped through the bore for facilitating the projecting of the pole during operation and use.

Provided last is a holster 74. The holster has a cylindrical region 76. The cylindrical region has a closed lower end 78 and an open upper end 80 for receiving the cylinders when disassembled. The holster has a strap 82. The strap has a fixed end 84. The fixed end is secured to the cylindrical region. The strap also has a free end 86. The free end has a coupling component 88. The coupling component allows for separable coupling to the cylindrical region. The holster further has spaced straps 90. The spaced straps are coupled to the cylindrical region for retaining the system adjacent to a leg of the user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A folding pole spear system comprising:

a plurality of hollow cylinders, each cylinder having the same outside diameter including a forward cylinder, a rearward cylinder, a central cylinder, a first intermediate cylinder between the forward cylinder and the central cylinder, and a second intermediate cylinder between the rearward cylinder and the central cylinder;

a first hollow coupling tube positioned in a forward portion of the second intermediate cylinder and a second hollow coupling tube positioned in a forward portion of the rearward cylinder, a third hollow coupling tube positioned in a forward portion of the central cylinder, a fourth hollow coupling tube being positioned in a rearward portion of the forward cylinder, with no hollow coupling tube being positioned in the first intermediate cylinder;

a pair of similarly configured short washers including a first washer with a small first axial aperture positioned into an intermediate region of the rearward cylinder and abutting the second hollow coupling tube and a second washer with a small second axial aperture positioned into an intermediate region of the forward cylinder and abutting the fourth hollow coupling tube; and an elastic cord having a rearward extent passing through the small first axial aperture with a first securement knot at its rearward end, the elastic cord having a forward extent passing through the small second axial aperture with a second securement knot at its forward end, and with an intermediate extent of the cord passing through all of the cylinders to insure the retention of each cylinder to the next adjacent cylinder, the cylinders adapted to be coupled into a long linear spear through the coupling action of the cylinders, tubes, washers, and cord.

2. The system as set forth in claim 1 and further including a replaceable tip with the replaceable tip having a point at its forward end and a cylindrical projection at its rearward end for positioning in the forward end of the forward cylinder.

3. The system as set forth in claim 1 and further including a replaceable tip with the replaceable tip having a plurality of diverging points at its forward end and a cylindrical projection at its rearward end for positioning in the forward end of the forward cylinder.

4. The system as set forth in claim 1 and further including a rearward plug having a forward end press fit into the rearward end of the rearward cylinder, the rearward plug having a rearward end with a diametrical bore there through with an elastic strap looped through the bore for facilitating the projecting of the pole during operation and use.

5. The system as set forth in claim 1 and further including a holster having a cylindrical region with a closed lower end and an open upper end for receiving the cylinders when disassembled, the holster also having a strap with a fixed end secured to the cylindrical region and a free end with a coupling component for separable coupling to the cylindrical region and with other spaced straps coupled to the cylindrical region for retaining the system adjacent to a leg of the user.

6. A folding pole spear system for safely and conveniently assembling, disassembling and utilizing a pole spear comprising, in combination:

a plurality of hollow cylinders including a forward cylinder, a rearward cylinder, a central cylinder, a first intermediate cylinder and a second intermediate cylinder, each cylinder being fabricated of aluminum and having a forward portion and a rearward portion with a substantially common diameter interiorly and exteriorly;

a hollow coupling tube positioned in the rearward portion of the forward cylinder and other hollow couplings tubes positioned in the forward portion of each cylinder except for the forward and first intermediate cylinders, each coupling tube being removably received in an adjacent portion of each adjacent cylinder except for the rearward cylinder;

a pair of similarly configured short washers including a first washer with a small first axial aperture positioned into an intermediate region of the rearward cylinder and abutting the hollow coupling tube in the rearward cylinder and a second washer with a small second axial aperture positioned into an intermediate region of the forward cylinder and abutting the hollow coupling tube in the forward cylinder;

an elastic cord having a rearward extent passing through the small first axial aperture with a first securement knot at its rearward end, the elastic cord having a forward extent passing through the small second axial aperture with a second securement knot at its forward end, and with an intermediate extent of the cord passing through all of the cylinders to insure the retention of each cylinder to the next adjacent cylinder, the cylinders adapted to be coupled into a long linear spear through the coupling action of the cylinders, tubes, plugs and cord;

a replaceable tip having a stainless steel point at its forward end and an aluminum cylindrical projection at its rearward end for positioning in the forward end of the forward cylinder;

another replaceable tip having a plurality of diverging stainless steel points at its forward end and an aluminum cylindrical projection at its rearward end for removably positioning it in the forward end of the forward cylinder;

a plastic rearward plug having a forward end press fit into the rearward end of the rearward cylinder, the rearward plug having a rearward end with a diametrical bore there through with an elastic strap looped through the bore for facilitating the projecting of the pole during operation and use; and a holster having a cylindrical region with a closed lower end and an open upper end for receiving the cylinders when disassembled, the holster also having a strap with a fixed end secured to the cylindrical region and a free end with a coupling component for separable coupling to the cylindrical region and with other spaced straps coupled to the cylindrical region for retaining the system adjacent to a leg of the user.

* * * * *